April 11, 1944.                C. L. PFEIFFER                2,346,327
                    ELECTRICALLY HEATED SOLDERING IRON
                         Filed Feb. 11, 1942
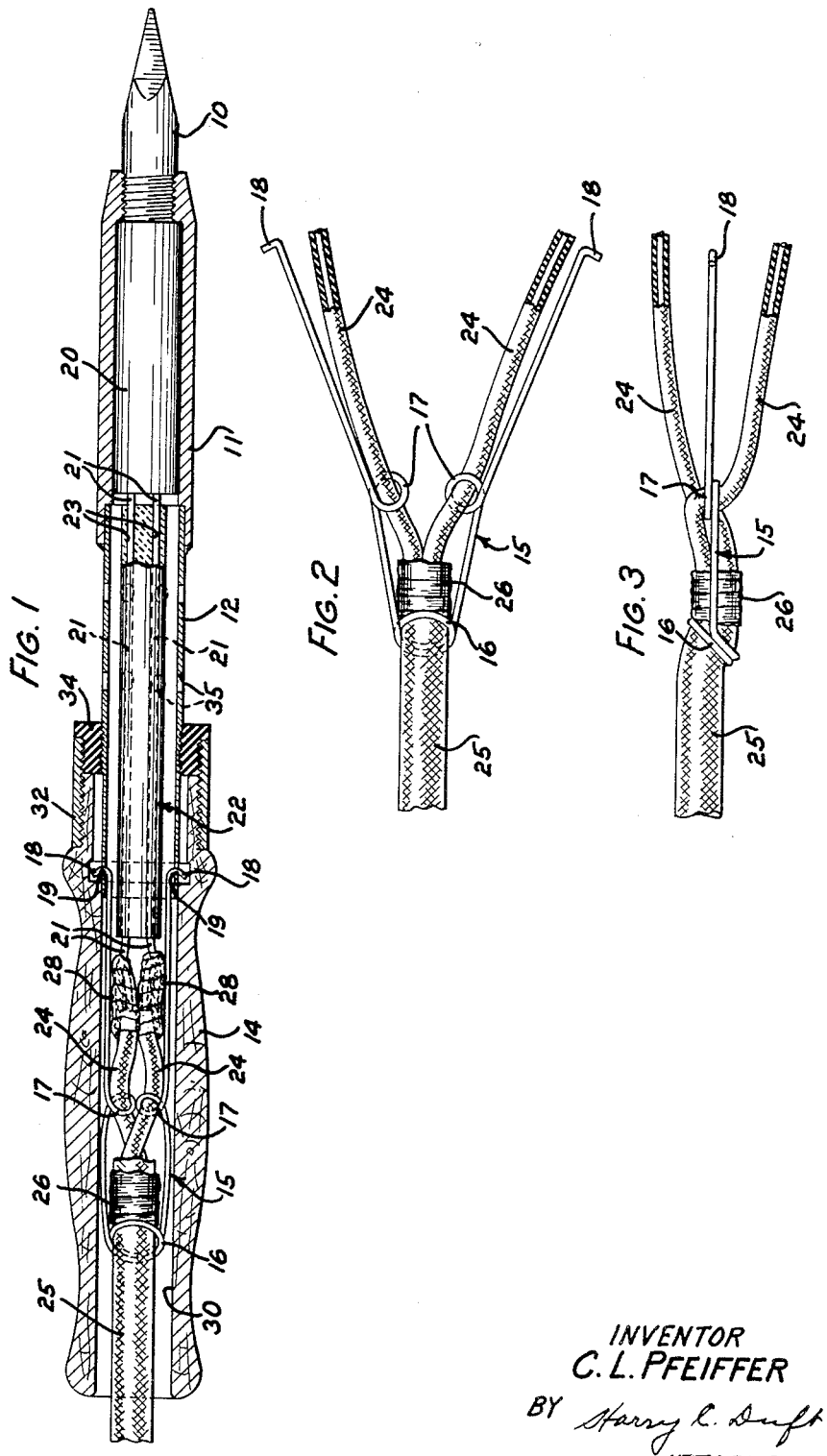
INVENTOR
C. L. PFEIFFER
BY Harry L. Duft
     ATTORNEY Patented Apr. 11, 1944

2,346,327

UNITED STATES PATENT OFFICE 2,346,327

ELECTRICALLY HEATED SOLDERING IRON

Conrad L. Pfeiffer, Chicago, Ill., assignor to Western Electric Company, Incorporated, New York, N. Y., a corporation of New York Application February 11, 1942, Serial No. 430,369

5 Claims. (Cl. 173—322)

This invention relates to soldering irons, and more particularly to improvements in electrically heated soldering irons.

Objects of the invention are to simplify and improve the construction of electrically heated soldering irons.

In accordance with one embodiment of the invention, an electrically heated soldering iron is provided, in which the conducting cord is anchored to the tubular stem or shank of the iron by a means of a V-shaped spring wire clip formed at its crotch with an eyelet for receiving the cord, the free ends of the clip being formed for interlocking engagement with the shank of the iron. The housing for the electrical heating element is formed of a metal having a relatively high thermal conductivity, such as aluminum bronze.

A preferred embodiment of the invention is illustrated in the accompanying drawing, in which Fig. 1 is a longitudinal sectional view of an electrically heated soldering iron embodying the features of the invention, and Figs. 2 and 3 are plan and elevational views, respectively, of the novel spring wire clip for anchoring the conducting cord to the tubular stem or shank of the iron.

The soldering iron illustrated in the drawing comprises a removable tip 10, a tubular housing or shell 11, a tubular stem or shank 12, and a tubular handle 14. The tip is threaded in one end of the shell, and the opposite end of the shell is rigidly secured, preferably by brazing, to one end of the tubular shank. To the opposite end of the shank there is removably secured a V-shaped spring wire clip 15. This clip is formed at its crotch with a cord-receiving loop or eyelet 16 which is angularly disposed, as best shown in Fig. 3, so that the inserted end of the cord is bent slightly and thus more firmly anchored to the clip. Each of the two wire portions extending from the loop 16 is formed intermediate its ends with a conductor-receiving loop or eyelet 17. The two free-end portions of the spring clip are formed with hook portions 18—18 for interlocking engagement with diametrically opposed apertures 19—19 provided in the tubular shank 12 adjacent the handle end thereof.

Encased within the shell 11 is a cartridge-type electrical heating element 20 which is disposed in abutting coaxial relation with the tip and has two electrical conducting leads 21—21 which extend through an insulating tube 22. This tube extends through the shank and is preferably formed of lavite and has two separate longitudinal bores 23—23, one for each of the leads 21.

The leads protrude from the end of the insulating tube and are spliced to the ends of the two conductors 24—24 of an electrical cord 25, as shown in Fig. 1. It will be noted that the end of the cord, after being inserted through the eyelet 16, is wrapped with several layers of friction tape 26, or the like, which together with the bend in the inserted end of the cord serves to anchor the cord to the wire clip and thereby relieves the strain on the spliced connections which would otherwise result when the cord is pulled or placed under tension. The individual conductors 24 of the cord are inserted through the separate eyelets 17 of the clip, one from above and other from below, as shown in the drawing, after which the end portions of the conductor wires are spliced to the conducting leads of the heating element. The spliced connections 28—28 are taped in the usual manner.

The heat from the heating element 20 is conducted to the tip 10 through the shell 11 which is composed of a material having a relatively high thermal conductivity, preferably an aluminum bronze alloy having an aluminum content of 4 to 8%.

The handle is composed of a suitable electrical and heat insulating material, preferably wood, and is formed with a longitudinal bore 30 for receiving the end of the shank 12 and the cord anchoring clip 15, as shown in Fig. 1. The bore is of slightly larger diameter at the inner end of the handle to accommodate the hook portions 18 of the clip. The handle is removably attached to the shank by means of an internally threaded sleeve 32 having one end attached to the handle and its opposite end removably threaded to a ferrule 34 which, in turn, is secured to the shank intermediate its ends. The ferrule 34 is composed of a suitable electrical and heat insulating material, preferably fibre.

It will be noted that the shank is provided with a plurality of apertures 35—35 to reduce the conduction of heat to the handle.

An important feature of the above described iron is the provision of the cord anchoring device 15 for anchoring the cord to the shank 12 in such a way that the spliced connections are relieved of strain when the cord is pulled or placed under tension. Another feature is the simplicity of the construction whereby the heating element may be replaced easily and quickly, when necessary. After detaching the handle 14 by unscrewing it from the ferrule 34, the cord anchoring clip 15 is disconnected from the shank 12. This is accomplished by simply pressing the ends of the clip toward each other to withdraw the hooks 18 of the clip from the apertures 19 in the shank. The heating element together with the insulating sleeve 22 are now freely withdrawable from the shell and shank, after which the conducting cord 20 is disconnected from the old heating element and spliced to a new one after its leads have been threaded through the insulating sleeve. The new heating element is then inserted through the shank 12 into the shell 11, after which the cord anchoring clip is again attached to the shank by first pressing the ends of the clip toward each other to insert them through the end of the shank, and then allowing the hooked ends 18 of the clip to spring into the apertures 19 in the shank. The handle is then slid over the clip and screwed onto the ferrule 34 on the shank.

It should be understood that the invention is not limited to the particular embodiments thereof and construction details herein illustrated and described but is capable of other applications within the scope of the appended claims.

What is claimed is:

1. In an electrically operated device, a tubular handle, an electrical conducting cord extending into the handle, and a cord anchoring element contained within the handle and comprising a V-shaped spring wire clip having a cord receiving loop portion disposed angularly with respect to the axis of the handle, said V-shaped spring wire clip having its legs resiliently urged radially outwardly with respect to the handle to lock the clip in the handle.

2. In an electrically operated device, a tubular shank, a tubular handle removably attached to an end portion of said shank, a multi-conductor electrical conducting cord extending into said handle, and a wire clip contained within the handle for anchoring the conducting cord to the said end portion of the shank, said wire clip comprising a resilient V-shaped member with a loop formed at its apex for receiving and engaging the cord and a loop formed in each leg for receiving the separate conductors of the cord, the legs of the clip having bent portions on the ends thereof for engaging portions of the shank to hold the clip in the handle.

3. In an electrically operated device, a tubular member having a pair of electrical conductors passing therethrough, an electrical conducting cord having a pair of conductors, the ends of which are spliced to said first mentioned conductor, and a conducting cord strain relieving device removably attached to the said end portion of the tubular member, said strain relieving device comprising a V-shaped spring wire clip having a cord receiving eyelet at the crotch thereof to engage the cord at a point removed from the splice and a cord conductor receiving eyelet in each of the two wire portions extending from said cord receiving eyelet to engage the separate cord conductors between the splice and crotch, the legs of the V-shaped spring wire clip being compressed to enter the tubular member and urged to engage said tubular member.

4. In an electrically operated device, a tubular member having a pair of electrical conductors passing therethrough, a tubular handle attached at one end to an end portion of said member, an electrical conducting cord extending into the opposite end of said handle and having a pair of conductors, the ends of which are spliced to said first mentioned conductors, and a conducting cord strain relieving device contained within the handle and removably attached to the said end portion of the tubular member, said strain relieving device comprising a V-shaped spring wire clip compressed and inserted in the tubular handle to extend longitudinally thereof and having a cord receiving eyelet at the crotch thereof to engage the cord at a point removed from the splice and a cord conductor receiving eyelet in each of the two wire portions extending from said cord receiving eyelet to engage the separate cord conductors between the splice and crotch, said cord and conductor receiving eyelets being disposed with their axes at an angle to the axis of the tubular member and the cord and conductors being laced through the eyelets to form sharp bends in the cord and conductors to fix them to the strain-relieving device.

5. In an electrical device, a tubular handle, a tubular member extending into and fixed to one end of the handle, a pair of clip receiving apertures formed in said tubular member, a two-conductor cord extending into the end of the handle opposite to the end at which the tubular member is fixed, a V-shaped spring clip having a loop at its apex through which the two-conductor cord may be inserted and loops in each of its legs, a shoulder formed on the cord for engagement by said loop, the two conductors of the cord being separately insulated and extending through loops formed in the legs of said V-shaped spring clip, the loops on the legs of the clip and at the apex thereof being disposed at angles one to another to grip the separate conductors and the cords and said clip having bent-over tips formed at the ends of its legs for engagement in the apertures in the tubular member when the clip is inserted in the handle to extend longitudinally thereof, the inherent resiliency of the clip urging the tips into said aperture.

CONRAD L. PFEIFFER.